(12) United States Patent
Terajima et al.

(10) Patent No.: US 10,931,627 B2
(45) Date of Patent: Feb. 23, 2021

(54) COMMUNICATION DEVICE, ADDRESS CONFIGURATION METHOD, AND RECORDING MEDIUM

(71) Applicant: JVC KENWOOD Corporation, Yokohama (JP)

(72) Inventors: Tatsuo Terajima, Yokohama (JP); Yasutoshi Sakai, Yokohama (JP); Kenta Uesaka, Yokohama (JP)

(73) Assignee: JVC KENWOOD CORPORATION, Yokohama (JP)

( * ) Notice: Subject to any disclaimer, the term of this patent is extended or adjusted under 35 U.S.C. 154(b) by 55 days.

(21) Appl. No.: 16/051,521

(22) Filed: Aug. 1, 2018

(65) Prior Publication Data

US 2018/0343231 A1    Nov. 29, 2018

Related U.S. Application Data

(63) Continuation of application No. PCT/JP2017/000714, filed on Jan. 12, 2017.

(30) Foreign Application Priority Data

Feb. 1, 2016  (JP) .............................. JP2016-017456

(51) Int. Cl.
*H04L 29/12* (2006.01)
*H04L 12/28* (2006.01)

(52) U.S. Cl.
CPC .......... *H04L 61/2046* (2013.01); *H04L 12/28* (2013.01); *H04L 12/2801* (2013.01);

(Continued)

(58) Field of Classification Search
CPC ............. H04L 61/2046; H04L 61/2038; H04L 12/2801; H04L 12/28; H04L 61/2076; H04L 61/2007
See application file for complete search history.

(56) References Cited

U.S. PATENT DOCUMENTS

2007/0268515 A1* 11/2007 Freund .................... H04L 67/34
                                                           358/1.15
2016/0028628 A1*  1/2016 Sun ........................ H04L 5/0044
                                                           370/392

FOREIGN PATENT DOCUMENTS

JP    2003046519 A    2/2003
JP    2006018468 A    1/2006

(Continued)

*Primary Examiner* — Soe Hlaing
(74) *Attorney, Agent, or Firm* — Brundidge & Stanger, P.C.

(57) ABSTRACT

A communication device is connected via a network, to a terminal device and another communication device for configuring an IP address of the terminal device. The communication device includes an address configuration information acquisition unit and an address configuration unit. The address configuration information acquisition unit acquires, from one of the terminal device and the other communication device, information indicating whether an IP address of the terminal device has been configured, and, in a case an IP address of the terminal device has been configured, information on the IP address configured. The address configuration unit configures an IP address of the terminal device in which an IP address has not been configured and which is not associated with the other communication device based on the information acquired by the address configuration information acquisition unit.

5 Claims, 19 Drawing Sheets

(52) U.S. Cl.
CPC ...... *H04L 61/2007* (2013.01); *H04L 61/2038* (2013.01); *H04L 61/2076* (2013.01)

(56) References Cited

FOREIGN PATENT DOCUMENTS

| | | |
|---|---|---|
| JP | 2008211504 A | 9/2008 |
| JP | 2011205219 A | 10/2011 |

* cited by examiner

FIG.2

| RECORDER_SEARCH | RECORDER ID |
|---|---|

FIG.3

| RECORDER_EXIST | RECORDER ID | IP ADDRESS | NUMBER OF CHANNELS | NUMBER OF REGISTERED CAMERAS |

FIG.4

| RECORDER ID | IP ADDRESS | NUMBER OF CHANNELS | NUMBER OF REGISTERED CAMERAS |
|---|---|---|---|
| 1 | 192.168.0.253 | 4 | 4 |
| 2 | 192.168.0.252 | 4 | 4 |
| 3 | 192.168.0.251 | 8 | 8 |
| 4 | 192.168.0.250 | 8 | 6 |
| . | . | . | . |
| . | . | . | . |
| . | . | . | . |

FIG.5

| RECORDER ID | IP ADDRESS | NUMBER OF CHANNELS | NUMBER OF REGISTERED CAMERAS |
|---|---|---|---|
| 1 | 192.168.0.253 | 4 | 0 |

FIG.6

CAMERA_SEARCH

FIG.7

| CAMERA_EXIST | IP ADDRESS | MAC ADDRESS |

FIG.8

| IP ADDRESS | MAC ADDRESS |
|---|---|
| 192.168.0.100 | MA1 |
| 192.168.0.101 | MA2 |
| 192.168.0.102 | MA3 |
| 192.168.0.103 | MA4 |

FIG.18

| RECORDER_EXIST | RECORDER ID | IP ADDRESS | NUMBER OF CHANNELS | NUMBER OF REGISTERED CAMERAS | CAMERA1 IP ADDRESS | CAMERA1 MAC ADDRESS | CAMERA2 IP ADDRESS | CAMERA2 MAC ADDRESS | CAMERA3 IP ADDRESS | CAMERA3 MAC ADDRESS | CAMERA4 IP ADDRESS | CAMERA4 MAC ADDRESS |
|---|---|---|---|---|---|---|---|---|---|---|---|---|

FIG.19

| RECORDER ID | IP ADDRESS | NUMBER OF CHANNELS | NUMBER OF REGISTERED CAMERAS |
|---|---|---|---|
| 1 | 192.168.0.253 | 4 | 4 |
| 2 | 192.168.0.252 | 4 | 4 |
| 3 | 192.168.0.251 | 8 | 8 |
| 4 | 192.168.0.250 | 8 | 6 |
| . | . | . | . |
| . | . | . | . |
| . | . | . | . |

| MAC ADDRESS | IP ADDRESS | RECORDER ID |
|---|---|---|
| MA1 | 192.168.0.100 | 1 |
| MA2 | 192.168.0.101 | 1 |
| MA3 | 192.168.0.102 | 1 |
| MA4 | 192.168.0.103 | 2 |
| MA5 | 192.168.0.104 | 2 |
| MA6 | 192.168.0.105 | 2 |
| . | . | . |
| . | . | . |
| . | . | . |

COMMUNICATION DEVICE, ADDRESS CONFIGURATION METHOD, AND RECORDING MEDIUM

CROSS-REFERENCE TO RELATED APPLICATION

This application is based upon and claims the benefit of priority from the prior Japanese Patent Application No. 2016-017456, filed on Feb. 1, 2016, the entire contents of which are incorporated herein by reference.

BACKGROUND

1. Field

The present invention relates to a communication technology, and, more particularly, to a communication device, an address configuration method, and a recording medium that assigns an IP address to a terminal device.

2. Description of the Related Art

A network camera system in which one network recorder that functions as a communication device (hereinafter, referred to as a recorder) and a plurality of network cameras (hereinafter, referred to as cameras) are connected to a network is known. After start-up, the recorder automatically assigns IP addresses of the plurality of cameras, registers these IP addresses, and configures encoding of the plurality of cameras. This simplifies the system's initial settings. The recorder uses the registered IP addresses to communicate with the cameras.

An exemplary technology to assign IP addresses to terminal devices on a network is disclosed in patent documents 1 and 2.
[patent document 1] JP-A-2003-46519
[patent document 2] JP-A-2008-211504

In the network camera systems according to these documents, however, no consideration is given to the case of a plurality of recorders connected to the same network. When a plurality of recorders are connected, the IP address of a given camera may be registered by a plurality of recorders in a duplicate manner. In this case, data will be delivered from one camera to a plurality of recorders in parallel so that the performance of data delivery will be lowered. Another concern is that the same IP address may be assigned to a plurality of cameras. In this case, competition between IP addresses occur in the same network with the result that communication may not be performed properly.

Still another concern is that the IP address already assigned to a given camera by a recorder connected earlier may be changed to another IP address by a recorder connected later. In this case, the recorder connected earlier cannot receive data from this camera.

SUMMARY

A communication device according to an embodiment is connected via a network, to a terminal device and another communication device for configuring an IP address of the terminal device and includes: an address configuration information acquisition unit that acquires, from one of the terminal device and the other communication device, information indicating whether an IP address of the terminal device has been configured, and, in a case an IP address of the terminal device has been configured, information on the IP address configured; and an address configuration unit that configures an IP address of the terminal device in which an IP address has not been configured and which is not associated with the other communication device based on the information acquired by the address configuration information acquisition unit.

Another embodiment relates to a communication system. The communication system includes a terminal device and a plurality of communication devices that are connected to the terminal device via a network, and the communication device is the communication device described above.

Still another embodiment relates to an address configuration method. The method is performed in a communication device connected via a network, to a terminal device and another communication device for configuring an IP address of the terminal device, the method including: acquiring, from one of the terminal device and the other communication device, information indicating whether an IP address of the terminal device has been configured, and, in a case an IP address of the terminal device has been configured, information on the IP address configured; and configuring an IP address of the terminal device in which an IP address has not been configured and which is not associated with the other communication device based on the information acquired by the acquiring.

Yet another embodiment relates to a recording medium. The recording medium is encoded with a program used in a communication device connected via a network, to a terminal device and another communication device for configuring an IP address of the terminal device, the program comprising computer-implemented modules including: an acquisition module that acquires, from one of the terminal device and the other communication device, information indicating whether an IP address of the terminal device has been configured, and, in a case an IP address of the terminal device has been configured, information on the IP address configured; and a configuration module that configures an IP address of the terminal device in which an IP address has not been configured and which is not associated with the other communication device based on the information acquired by the acquisition module.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2 shows a recorder search command according to the first embodiment;

FIG. 3 shows a recorder search command response according to the first embodiment;

FIG. 4 shows a system information table according to the first embodiment;

FIG. 5 shows a host recorder information table according to the first embodiment;

FIG. 6 shows a camera search command according to the first embodiment;

FIG. 7 shows a camera search command response according to the first embodiment;

FIG. 8 shows a camera information table according to the first embodiment;

FIG. 18 shows the recorder search command response according to the second embodiment; and FIG. 19 shows the system information table according to the second embodiment.

DETAILED DESCRIPTION

The invention will now be described by reference to the preferred embodiments. This does not intend to limit the scope of the present invention, but to exemplify the invention.

First Embodiment

Figure 1:
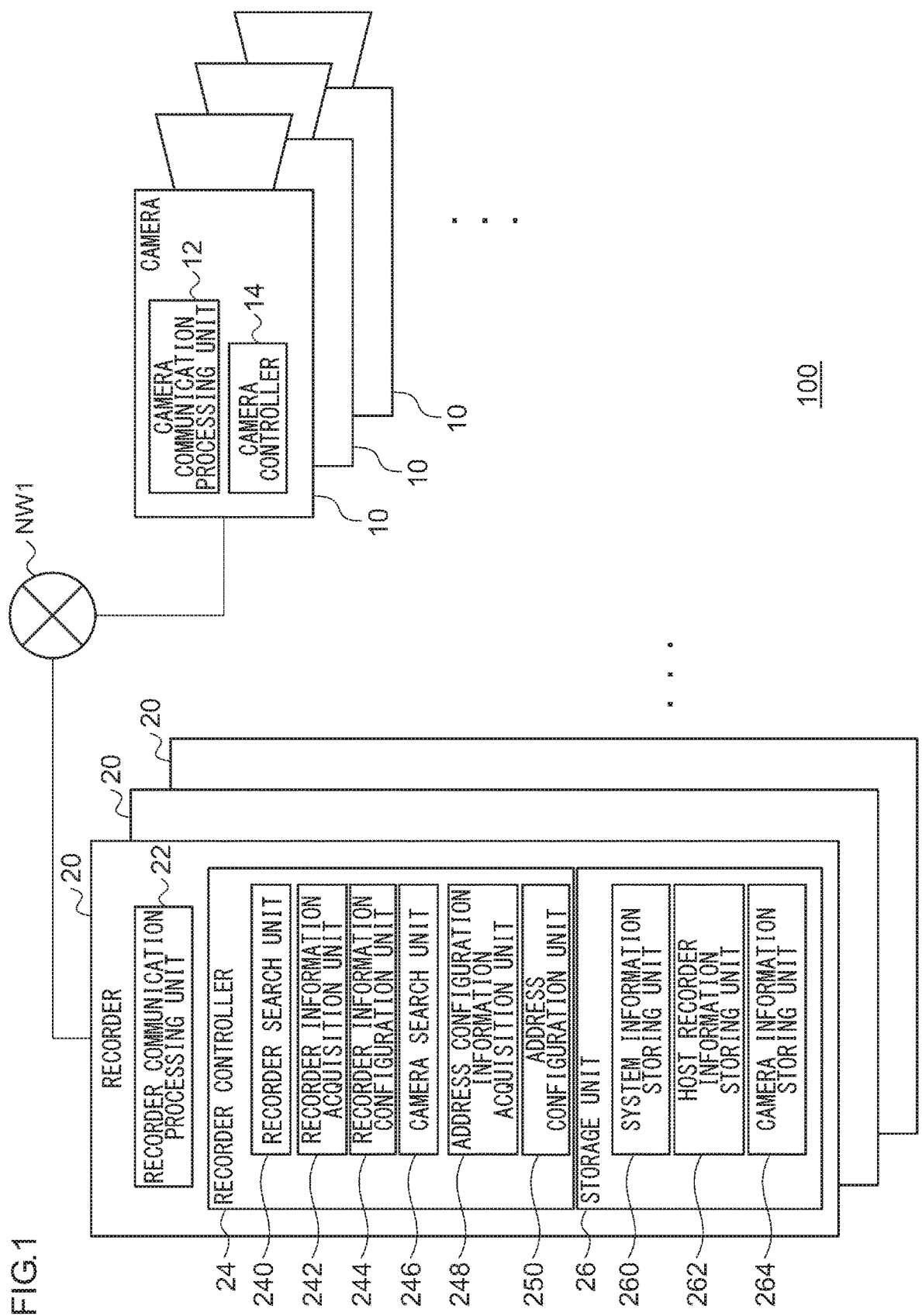
FIG. 1 is a block diagram showing a schematic configuration of a network camera system according to the first embodiment.

FIG. 1 is a block diagram showing a schematic configuration of a network camera system (communication system) 100 according to the first embodiment. The network camera system 100 includes a network NW1, a plurality of cameras (terminal device) 10 connected to the network NW1, and a plurality of recorders (communication device) 20 connected to the network NW1.

The network NW1 may be a wired network, wireless network, or a combination thereof.

Each camera 10 includes a camera communication processing unit 12 and a camera controller 14.

After an IP address is configured, each camera performs predetermined communication by transmitting and receiving data based on the IP address. For example, the camera delivers captured imaged data for moving images or still images to a recorder 20 via the network NW1. Due to the constraints on the processing performance, etc., each camera 10 is expected to perform predetermined communication only with one recorder. Requests for predetermined communication from a plurality of recorders 20 may result in a failure in the communication process.

The camera communication processing unit 12 transmits and receives data via the network NW1. An IP address is configured in the camera communication processing unit 12. Before the IP address is configured, an IP address of a predetermined initial value is configured. It can be said that an IP address has not been configured if the IP address has a predetermined initial value. The initial value may be an arbitrary value. For example, it may be 192.168.0.2. The initial value is common to the cameras 10 connected to the network NW1.

The camera controller 14 controls the entirety of the camera 10.

Each recorder 20 includes a recorder communication processing unit 22, a recorder controller 24, and a storage unit 26. The recorder controller 24 includes a recorder search unit 240, a recorder information acquisition unit 242, a recorder information configuration unit 244, a camera search unit 246, an address configuration information acquisition unit 248, and an address configuration unit 250. The storage unit 26 includes a system information storing unit 260, a host recorder information storing unit 262, and a camera information storing unit 264. Further, the storage unit 26 records various information.

After start-up, each recorder 20 automatically processes initial configuration to configure the recorder's own (internal) recorder ID (identifier) and an IP address. The recorder 20 configures an IP address of the camera 10 as necessary and registers the camera 10. When initial configuration has been processed, the recorder 20 uses the IP address configured to perform predetermined communication with the registered camera 10. The recorder 20 records image data delivered from the registered camera 10 in the storage unit 26.

The recorder communication processing unit 22 transmits and receives data via the network NW1. An IP address is configured in the recorder communication processing unit 22. Before the IP address is configured, an IP address of a predetermined initial value is configured. The initial value may be an arbitrary value. For example, it may be 192.168.0.3.

The recorder communication processing unit 22 transmits and receives data based on the IP address and transmits and receives data based on a MAC address. The recorder communication processing unit 22 transmits and receives data based on the IP address and transmits and receives data based on the MAC address, based on various commands transmitted from the recorder controller 24. In the following description, the recorder search unit 240, etc. included in the recorder controller 24 is described as transmitting a command, etc. directly. In practice, however, the recorder communication processing unit 22 transmits and receives data based on the IP address and transmits and receives data based on the MAC address as appropriate.

The recorder search unit 240, the recorder information acquisition unit 242, the recorder information configuration unit 244, the camera search unit 246, and the address configuration information acquisition unit 248, and the address configuration unit 250 perform an initial configuration process.

The recorder search unit 240 broadcasts a recorder search command including a recorder ID over the network NW1 to search for another recorder 20 having that recorder ID.

Figure 2:
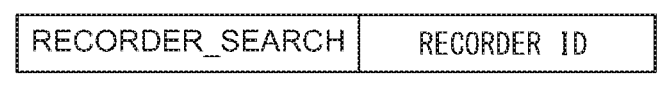

FIG. 2 shows a recorder search command according to the first embodiment. The recorder search command includes an identifier of the recorder search command (RECORDER_SEARCH) and a recorder ID searched for.

When the internal recorder ID of another recorder 20 receiving the recorder search command is equal to the recorder ID in the recorder search command, the recorder search unit 240 of the other recorder 20 transmits a recorder search command response. The other recorder 20 does not transmit a recorder search command response when the internal recorder ID is different from the recorder ID of the recorder search command. No processes are performed in another camera 10 receiving the recorder search command.

FIG. 3 shows a recorder search command response according to the first embodiment. The recorder search command response includes an identifier of the recorder search command response (RECORDER_EXIST), the recorder ID, the IP address, the number of channels, and the number of registered cameras. The recorder ID represents the recorder ID of the recorder 20 transmitting the recorder search command response (hereinafter, referred to as relevant recorder 20). The IP address represents the IP address configured in the relevant recorder 20. The number of channels represents the maximum number of cameras 10 that can be registered in the relevant recorder 20. The number of registered cameras represents the number of cameras 10 registered in the relevant recorder 20. As described above, the recorder 20 registers the camera 10 in which the IP address is configured. It can therefore be said that the maximum number of cameras 10 that can be registered is equal to the maximum number of cameras 10 in which the relevant recorder 20 can configure the IP address. The number of registered cameras 10 can be said to be the number of cameras 10 in which the relevant recorder 20 has configured the IP address (this holds true throughout the specification).

Referring back to FIG. 1, the recorder information acquisition unit 242 acquires the recorder search command response from the other recorder 20 via the network NW1. The recorder information acquisition unit 242 analyzes the received recorder search command response and acquires the information related to the responding recorder 20, i.e., the recorder ID, the IP address, the number of channels, and the number of registered cameras.

The recorder search unit 240 searches for other recorders 20 in sequence by incrementing, starting with 1, the recorder ID by 1 every time there is a response from another recorder 20. Therefore, given that there are n (n is a positive integer) other recorders 20, n sets of the recorder ID, the IP address, the number of channels, and the number of registered cameras are acquired.

The system information storing unit 260 stores the information related to the recorders 20 acquired by the recorder information acquisition unit 242 in the form of a system information table.

FIG. 4 shows a system information table according to the first embodiment. The system information table includes a plurality of recorder IDs, IP addresses mapped to the respective recorder IDs, numbers of channels mapped to the respective recorder IDs, and the numbers of registered cameras 10 mapped to the respective recorder IDs.

Referring back to FIG. 1, the recorder information configuration unit 244 refers to the system information table and configures a recorder ID greater by 1 than the greatest recorder ID acquired from the other recorders 20 as the host (internal) recorder ID. Further, the recorder information configuration unit 244 configures the IP address of the host recorder 20 so as not to overlap the IP addresses configured in the other recorders 20. The range of values of IP addresses that can be configured in the recorder 20 (e.g., 192.168.0.240~192.168.0.253) and the range of values of IP addresses that can be configured in the camera 10 (e.g., 192.168.0.100~192.168.0.200) are predetermined and stored in the storage unit 26 of the recorder 20. The predetermined range of values of IP addresses may be configured to be modified later.

The host recorder information storing unit 262 stores the information related to the host recorder 20, i.e., the recorder ID, the IP address, the number of channels, and the number of registered cameras, in the form of a host recorder information table. The number of channels represents the maximum number of cameras 10 that can be registered in the host recorder 20. The number of registered cameras represents the number of cameras 10 registered in the host recorder 20. In other words, the information is stored in a manner similar to that of the number of channels and the number of registered cameras in the recorder search command response.

FIG. 5 shows a host recorder information table according to the first embodiment. The host recorder information table includes the recorder ID, the IP address, the number of channels, and the number of registered cameras. The recorder ID, the IP address, and the number of registered cameras in the host recorder information table are modified as appropriate when the value thereof is configured, etc. and are stored accordingly. Meanwhile, the number of channels is determined by the specification of the recorder 20 and is not modified. The number of registered cameras is 0 until the camera registration process is performed.

After the recorder ID is determined, the camera search unit 246, the address configuration information acquisition unit 248, and the address configuration unit 250 in the recorder 20 having the recorder ID of 1 perform a camera registration described later provided that the maximum number of cameras 10 have not been registered. That the maximum number of cameras 10 have not been registered means that the number of registered cameras in the host recorder information table is smaller than the number of channels.

After the recorder ID is determined, the recorder search unit 240 in the recorder 20 having the recorder ID other than 1 transmits a recorder search command and searches for the recorder 20 having the recorder ID smaller by 1 than the recorder ID of the transmitting recorder 20. The recorder information acquisition unit 242 refers to the recorder search command response transmitted by the recorder 20 having the recorder ID smaller by 1 than the host recorder ID to acquire the number of channels and the number of registered cameras. When the recorder 20 having the recorder ID smaller by 1 than the host recorder ID has registered the maximum number of cameras 10 and the host recorder 20 has not registered the maximum number of cameras 10, the camera search unit 246, the address configuration information acquisition unit 248, and the address configuration unit 250 perform the following camera registration process.

When the recorder 20 having the recorder ID smaller by 1 than the host recorder ID has registered the maximum number of cameras 10, it means that all of the recorders 20 having the recorder IDs smaller than the host recorder ID have registered the maximum number of cameras 10. This is because the recorder ID is assigned to the recorders 20 in the ascending order that the recorders 20 are started up, starting with 1. A confirmation may be made to see whether all of the recorders 20 having the recorder ID smaller than the host recorder ID have registered the maximum number of cameras 10.

The camera search unit 246 broadcasts a camera search command over the network NW1 to search for a plurality of cameras 10. The camera search command may be multicasted instead of broadcasted.

Figure 6:
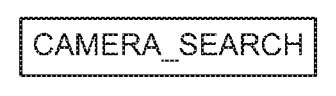

FIG. 6 shows a camera search command according to the first embodiment. The camera search command includes an identifier of the camera search command (CAMERA_SEARCH).

Each camera 10 that receives the camera search command transmits a camera search command response.

Figure 7:
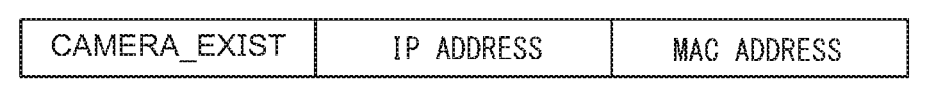

FIG. 7 shows a camera search command response according to the first embodiment. The camera search command response includes an identifier of the camera search command response (CAMERA_EXIST), and the IP address and the Media Access Control (MAC) address of the camera 10. The camera search command response may include information indicating the type of the camera such as the model name, etc. of the camera 10. The information indicating the type of the camera is referred to in the recorder 20 to perform communication suited to the specification of the camera 10.

The address configuration information acquisition unit 248 receives the camera search command response from a plurality of cameras 10 via the network NW1. The address configuration information acquisition unit 248 analyzes the camera search command response and acquires the IP addresses from the plurality of cameras 10.

The address configuration unit 250 identifies, of the plurality of cameras 10, the cameras 10 not registered in the other recorders 20 based on the IP addresses acquired by the address configuration information acquisition unit 248 and configures IP addresses in the identified cameras 10 in such a manner that the IP addresses do not overlap.

More specifically, the address configuration unit 250 identifies the camera 10 in which the IP address is the initial value as the camera 10 not registered in the other recorders 20, i.e., the camera 10 in which an IP address has not been registered.

The camera search command response may include information indicating whether or not an IP address has been configured in the responding camera 10. In this case, the address configuration unit 250 identifies the camera 10 in which an IP address has not be configured based on that information. When the information indicating whether or not an IP address has been configured in the camera 10 indicates that an IP address has been registered, the value of the IP address included in the camera search command response will be the information on the IP address already configured.

Stated otherwise, whether or not the value of the IP address included in the camera search command response shown in FIG. 7 is the predetermined initial value indicates whether or not an IP address has been registered in that camera 10. Further, when the value of the IP address is not the predetermined initial value, the value of the IP address will be the information on the IP address already configured.

Subsequently, the address configuration unit 250 requests, via the network NW1, an IP address, different from the configured IP addresses acquired by the address configuration information acquisition unit 248 and selected arbitrarily from the aforementioned predetermined range of IP addresses that can be configured in the camera 10, to be configured in the camera 10 identified as a camera in which an IP address has not been configured. In other words, the address configuration unit 250 configures IP addresses so as not to overlap each other within the network NW1. The request is made only to the responding camera 10 by using the MAC address acquired in the camera search command response.

The camera information storing unit 264 registers the camera 10 in which the address configuration unit 250 has configured the IP address. More specifically, the camera information storing unit 264 registers the information related to the camera 10 in which the IP address has been configured in a camera information table.

FIG. 8 shows a camera information table according to the first embodiment. The camera information table includes the IP address of the camera 10 that the address configuration unit 250 has configured and the MAC address of the camera 10. The MAC address is the value acquired in the camera search command response.

After the camera 10 has been registered, the address configuration unit 250 updates the number of registered cameras in the host recorder information table of FIG. 5. In other words, the address configuration unit 250 causes the number of registered cameras in the host recorder information table to match the number of IP addresses stored in the camera information table.

After the initial configuration process described above has been completed, the recorder 20 changes the encoding setting etc. of the camera 10 in which the recorder 20 has configured the IP address in accordance with the characteristics of the recorder 20. Communication to change the encoding setting etc. is also included in the predetermined communication. Further, the recorder 20 requests the camera 10 in which the recorder 20 has configured the IP address to deliver captured imaged data for moving images or still images to the recorder 20 via the network NW1.

A description will now be given of the initial configuration process in the recorder 20 with reference to flowcharts. The initial configuration process includes a recorder ID determination process, a camera registration pre-process, and a camera registration process.

[Recorder ID Determination Process]

Figure 9:
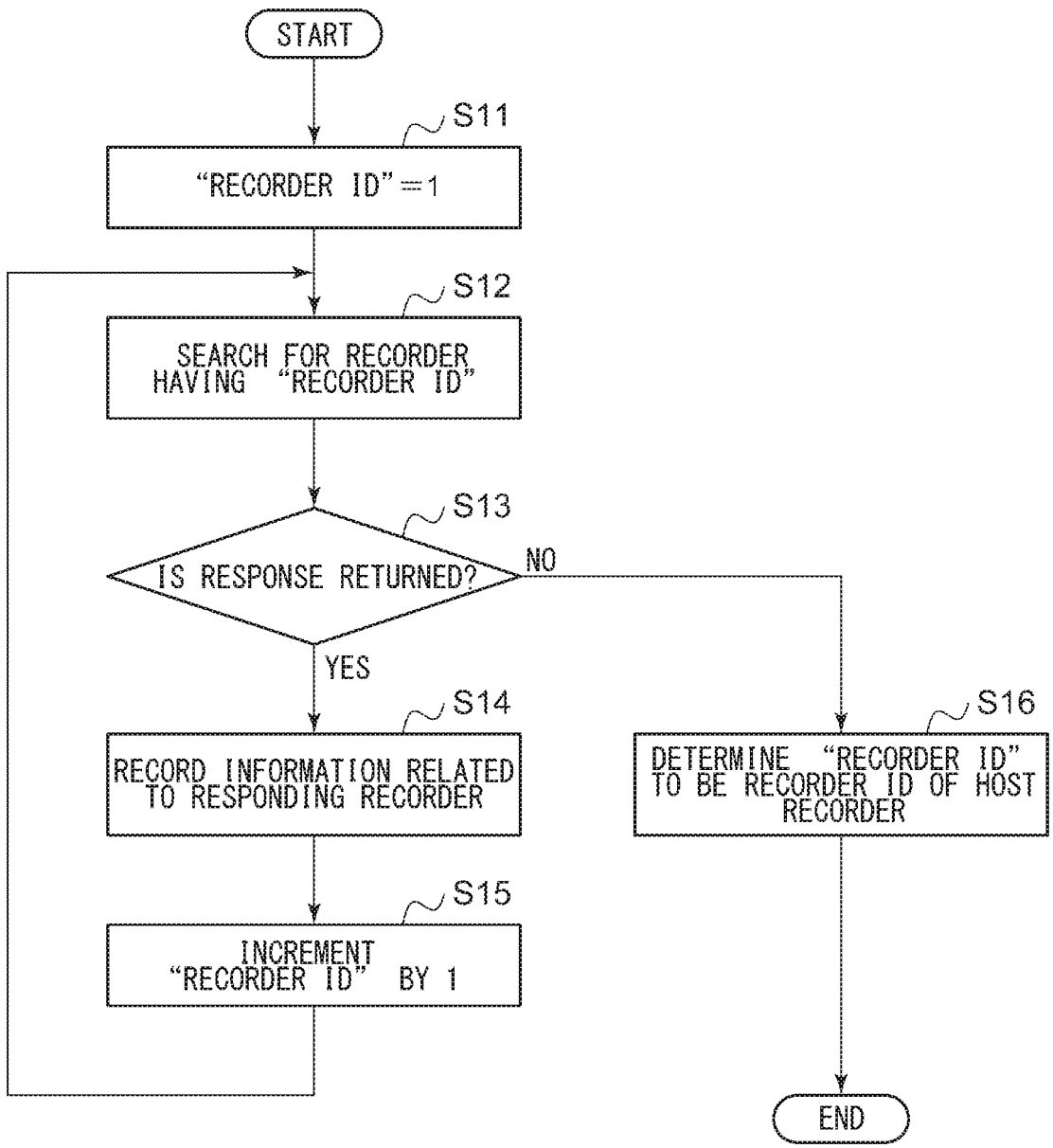
FIG. 9 is a flowchart showing a recorder ID determination process in the recorder of FIG. 1.

FIG. 9 is a flowchart showing a recorder ID determination process in the recorder 20 of FIG. 1. After the recorder 20 is started, the recorder search unit 240 configures the recorder ID in the recorder search command to 1 (step S11) and searches for the recorder 20 having the configured recorder ID (step S12). When the recorder search command response is returned (step S13; YES), the recorder information acquisition unit 242 acquires the information related to the responding recorder 20, and the system information storing unit 260 stores the information in the system information table (step S14). The recorder search unit 240 increments the recorder ID by 1 (step S15) and returns to the process of step S12.

In the absence of the recorder search command response (step S13; NO), on the other hand, the recorder information configuration unit 244 determines the current recorder ID to be the host recorder ID (step S16) and terminates the process. The recorder ID thus determined is stored as the recorder ID in the host recorder information table.

By causing all of the recorders 20 started up to perform this recorder ID determination process, the unique recorder IDs are assigned to the recorders 20 in the ascending order that the recorders 20 are started up, starting with 1, and the IP addresses are also assigned as described above.

The recorder 20 having completed the above recorder ID determination process performs a camera registration pre-process. Therefore, the camera registration pre-process is started in the order of the recorder IDs, starting with the recorder 20 having the recorder ID of 1. While a given recorder 20 is performing a camera registration pre-process, the recorder 20 having the next recorder ID may start a camera registration pre-process.

[Camera Registration Pre-Process]

Figure 10:
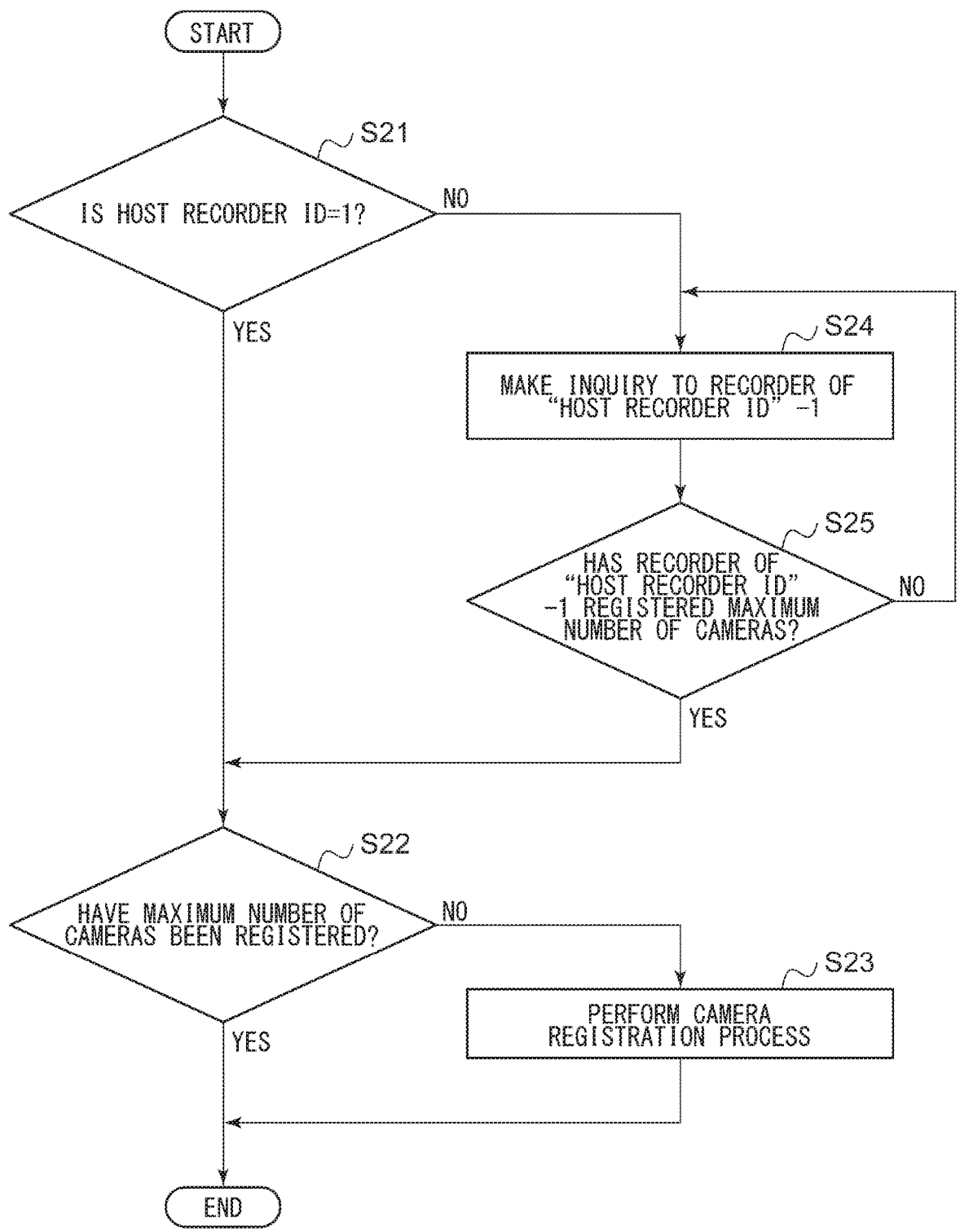
FIG. 10 is a flowchart showing a camera registration pre-process of the recorder of FIG. 1.

FIG. 10 is a flowchart showing a camera registration pre-process of the recorder 20 of FIG. 1. When the recorder ID of the host recorder is 1 (step S21; YES), the camera search unit 246 refers to the host recorder information table of FIG. 5 to check whether the maximum number of cameras 10 have been registered (step S22).

When the maximum number of cameras have been registered (step S22; YES), the process is terminated. When the maximum number of cameras have not been registered (step S22; NO), the camera search unit 246 performs a camera registration process (step S23).

When the recorder ID of the host recorder is not 1 (step S21; NO), the recorder search unit 240 uses the recorder search command to make an inquiry to the recorder 20 having the recorder ID smaller by 1 than the host recorder ID (step S24). The number of channels and the number of registered cameras in the recorder search command response in response to the recorder search command are referred to. When the responding recorder has registered the maximum number of cameras 10 (step S25; YES), control proceeds to step S22 described above. When the responding recorder 20 has not registered the maximum number of cameras 10 (step S25; NO), control is returned to step S24. Upon a return to step S24, a wait time may be established to prevent congestion in the network NW1 by frequent inquiries to the recorder 20 in step S24.

When NO is returned in step S25, it may mean that another recorder 20, which could be the recorder 20 having the recorder ID smaller by 1 than the host recorder ID, may be performing a camera registration process. When a camera registration process is performed in the host recorder 20 while a camera registration process is being performed in another recorder 20, a failure may occur in the camera registration process. Therefore, control does not proceed to step S22 when NO is returned in step S25 to prevent a camera registration process (S23) from being performed, and control is returned to step S24.

When some other measure is employed to prevent a failure in the camera registration process from occurring, for example, the processes in steps S21, S24, and S25 may be omitted. Step S22 may be performed immediately after the flow is started. In this case, the number of channels and the number of registered cameras in the recorder search command response shown in FIG. 3 will be unnecessary and may be deleted. The same is true of the number of channels and the number of registered cameras in the system information table shown in FIG. 4.

[Camera Registration Process]

Figure 11:
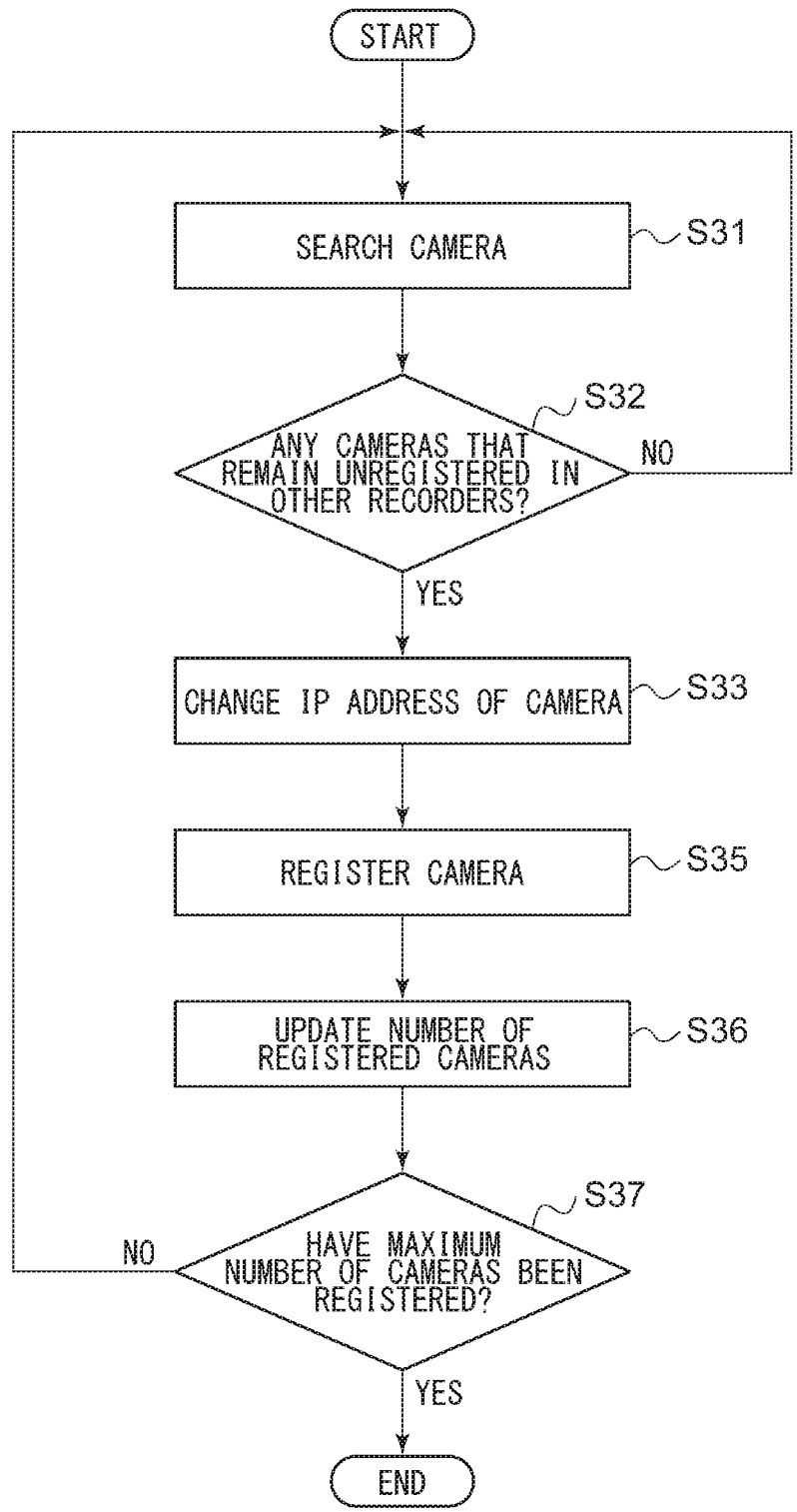
FIG. 11 is a flowchart showing a camera registration process in the recorder of FIG. 1.

FIG. 11 is a flowchart showing a camera registration process in the recorder 20 of FIG. 1. First, the camera search unit 246 searches for cameras 10 (step S31). When, as a result of the search, no cameras 10 remain unregistered in the other recorders 20 (step S32; NO), control is returned to step S31. Upon a return to step S31, a wait time may be established to prevent congestion in the network NW1 by frequent searches for the cameras 10 in step S31.

When the cameras 10 not registered in other recorders 20 are found (step S32; YES), the address configuration unit 250 changes the IP address of one of the identified cameras 10 (step S33). The camera information storing unit 264 registers the information related to this camera (step S35). Subsequently, the address configuration unit 250 updates the number of registered cameras (step S36).

Subsequently, when the maximum number of cameras 10 have been registered (step S37; YES), the process is terminated. When the maximum number of cameras 10 have not been registered yet (step S37; NO), control is returned to the process of step S31. When a plurality of cameras 10 were identified by the search in step S31 previously performed, the process of step S32 and the subsequent steps may be performed, upon a return to step S31, for the rest of the cameras 10 for which the process of step S32 and the subsequent steps have not been performed, instead of searching for the cameras 10 again.

The recorder 20 having completed the camera registration process uses the IP addresses of the plurality of cameras 10 registered to receive imaged data from the plurality of cameras 10 registered.

A description will now be given of a specific example of the initial configuration process in the network camera system 100. Hereinafter, eight cameras 10 are respectively referred to as cameras 10-1~10-8 for the purpose of distinction, and two recorders 20 are respectively referred to as recorders 20-1, 20-2 for the purpose of distinction.

[First Example of the Initial Configuration Process]

Figure 12:
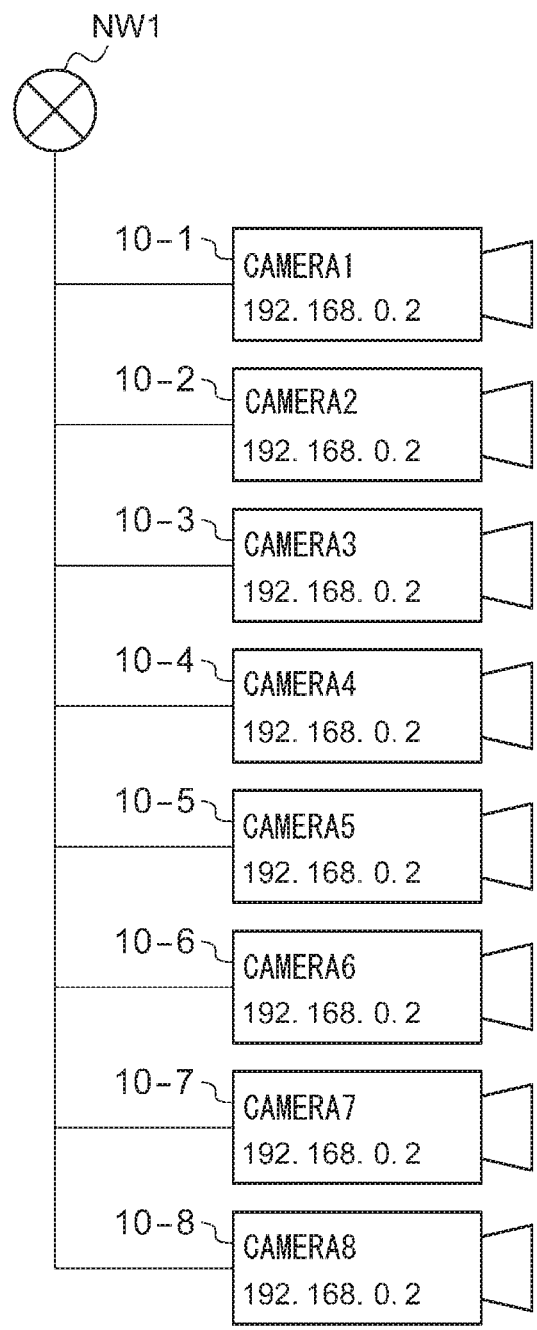
FIG. 12 shows a first example of the initial configuration process in the recorder in the network camera system.

FIG. 12 shows a first example of the initial configuration process in the recorder 20 in the network camera system 100. In this state, only eight cameras 10-1~10-8 are connected to the network NW1. The IP addresses of the cameras 10-1~10-8 all have the initial predetermined value of 192.168.0.2.

Figure 13:
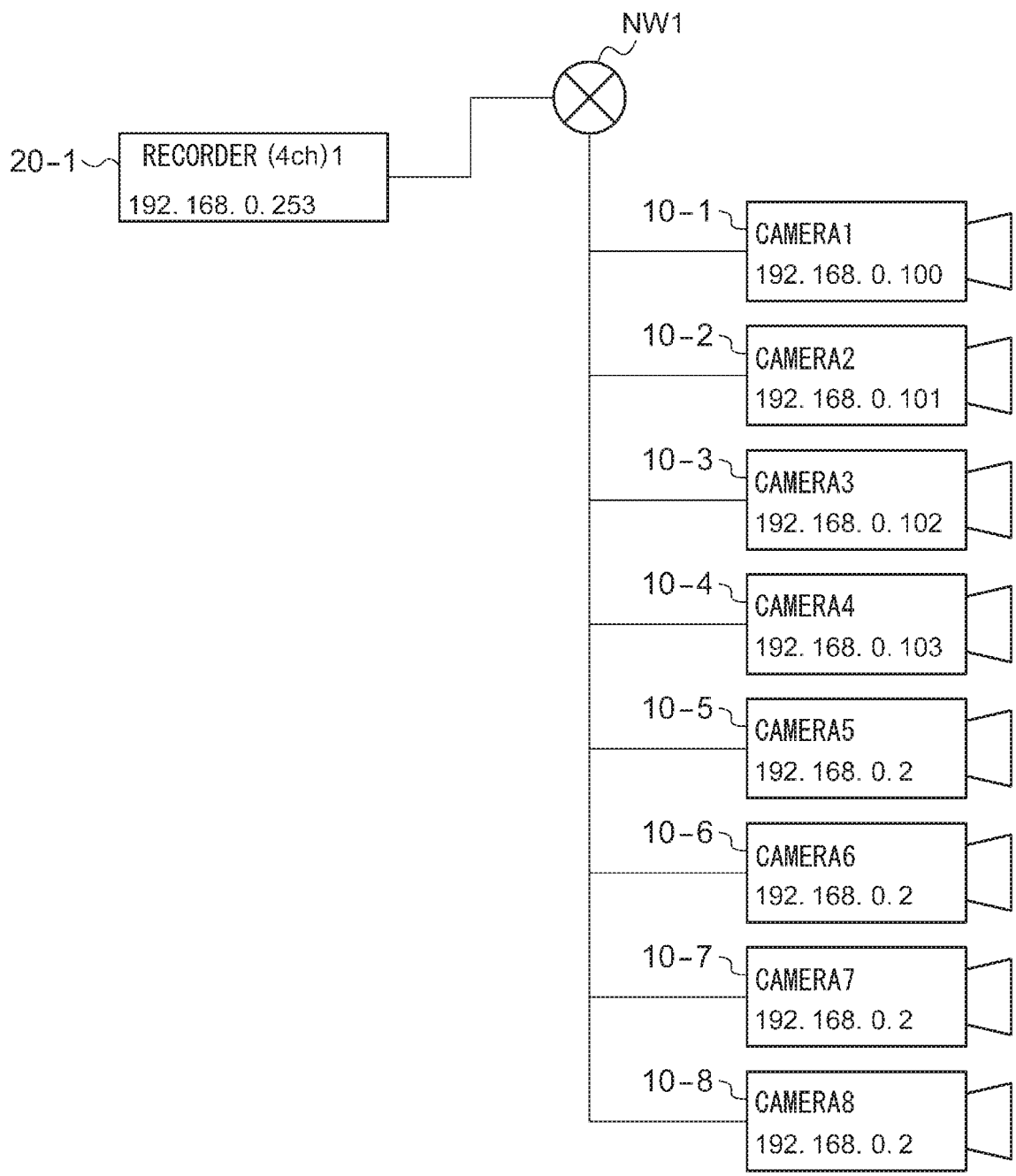
FIG. 13 shows the first example of the initial configuration process in the recorder, showing a phase that follows FIG. 12.

FIG. 13 shows the first example of the initial configuration process in the recorder 20, showing a phase that follows FIG. 12. In this state, one recorder 20-1 is further connected to the network NW1. The number of channels of the recorder 20-1 is four, and the number of registered cameras before start-up is 0. After start-up, the recorder 20-1 determines the recorder ID in accordance with the recorder ID determination process described above. In this example, the recorder ID is 1, and the IP address is, for example, 192.168.0.253, which does not overlap the other addresses in the network NW1.

Subsequently, the recorder 20-1 performs the camera registration pre-process and the camera registration process described above. The search for the cameras 10 identifies the eight cameras 10-1~10-8 with the IP addresses having the initial value. Therefore, the recorder 20-1 configures non-overlapping IP addresses (e.g., 192.168.0.100~192.168.0.103) in four arbitrarily selected cameras 10-1~10-4, respectively, and registers the cameras 10-1~10-4.

Figure 14:
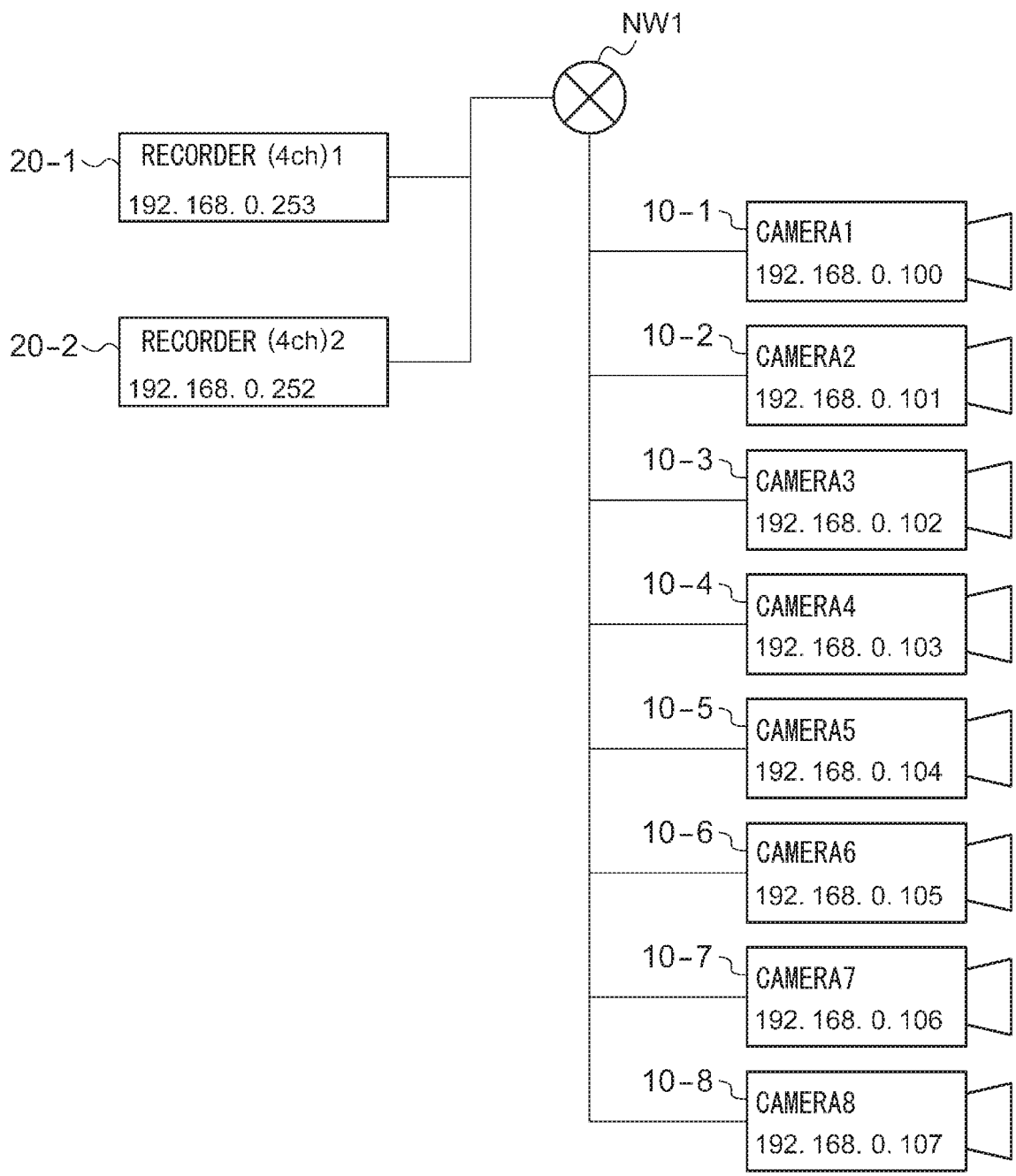
FIG. 14 shows the first example of the initial configuration process in the recorder, showing a phase that follows FIG. 13.

FIG. 14 shows the first example of the initial configuration process in the recorder 20, showing a phase that follows FIG. 13. In this state, another recorder 20-2 is connected to the network NW1. The number of channels of the recorder 20-2 is four, and the number of registered cameras before start-up is 0. After start-up, the recorder 20-2 determines the recorder ID in accordance with the recorder ID determination process described above. The recorder ID is 2, and the IP address is a non-overlapping address of, for example, 192.168.0.252.

Subsequently, the recorder 20-2 performs the camera registration pre-process and the camera registration process described above. The search for the cameras 10 identifies the four cameras 10-5~10-8 with the IP addresses having the initial value. Therefore, the recorder 20-2 configures non-overlapping IP addresses (e.g., 192.168.0.104~192.168.0.107) in the four cameras 10-5~10-8, respectively, and registers the cameras 10-5~10-8.

[Second Example of the Initial Configuration Process]

The second example of the initial configuration process differs from the first example in respect of the state that occurs after one recorder 20-1 is connected to the network NW1.

Figure 15:
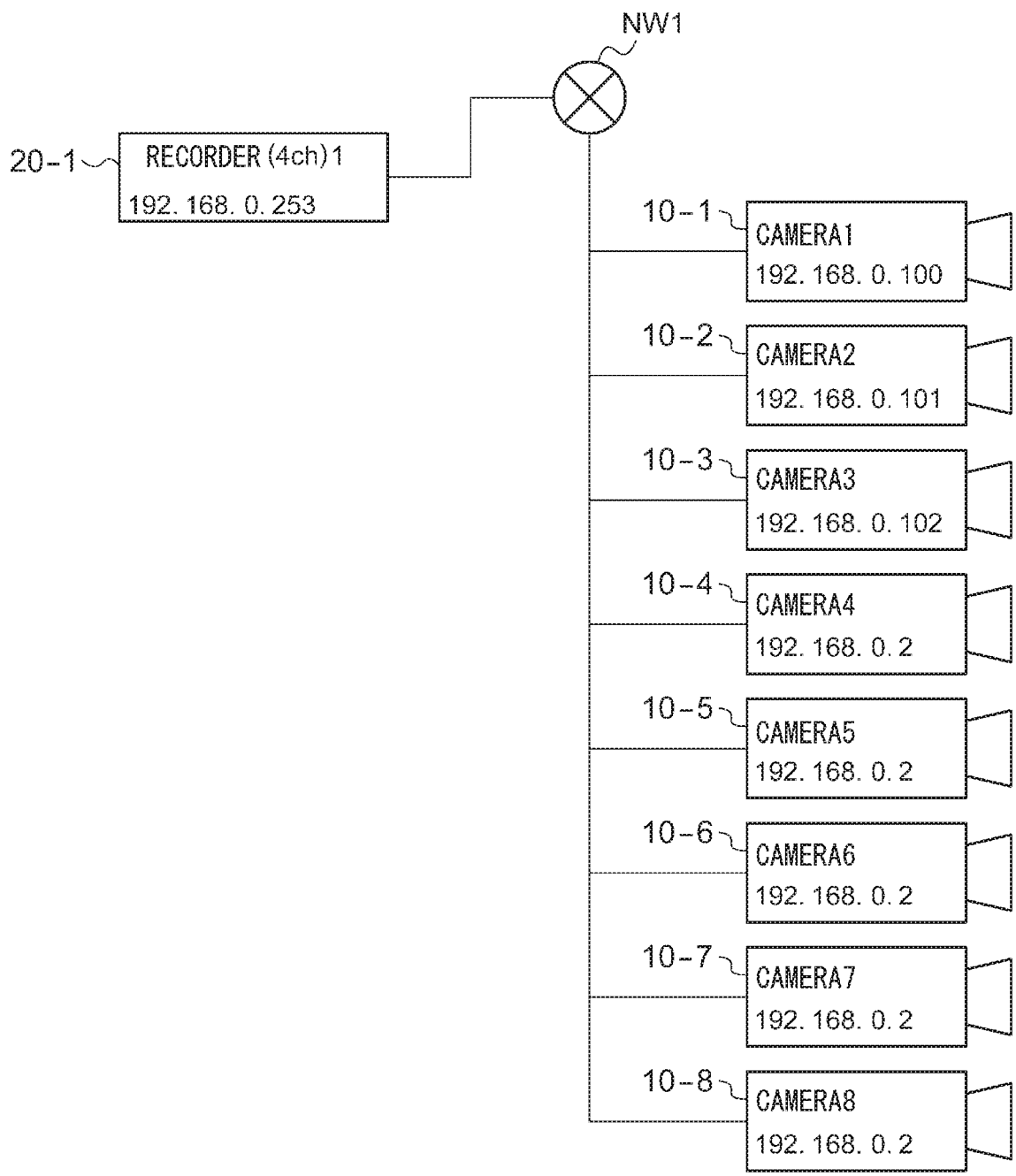
FIG. 15 shows a second example of the initial configuration process in the recorder in the network camera system.

FIG. 15 shows a second example of the initial configuration process in the recorder 20 in the network camera system 100. In this state, the recorder 20-1 has configured non-overlapping IP addresses in the three cameras 10-1~10-3 and has registered the cameras 10-1~10-3. The number of channels of the recorder 20-1 is four, and the number of registered cameras before start-up is 3. An IP address for the fourth camera 10-4 has not been configured yet.

Figure 16:
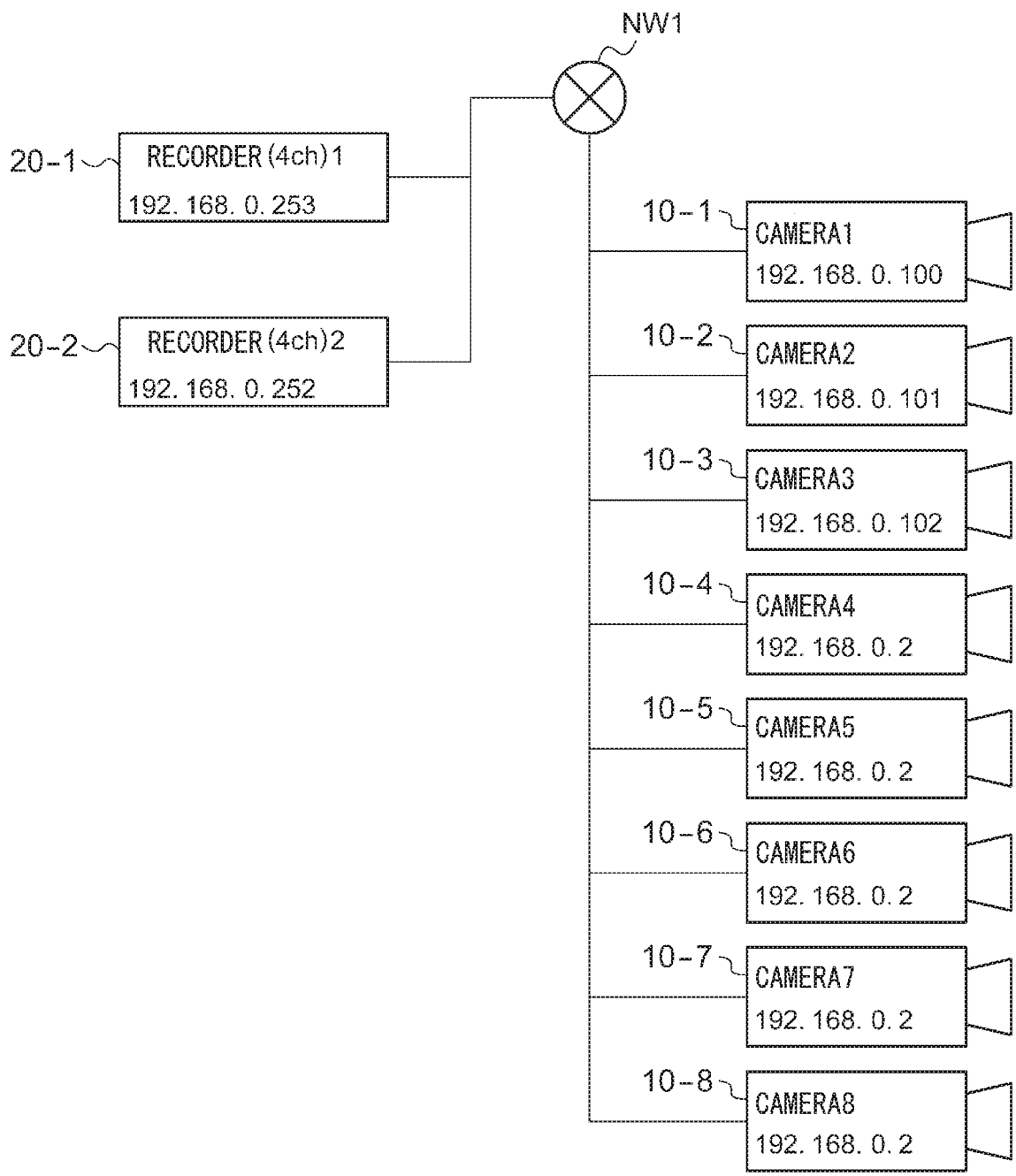
FIG. 16 shows the second example of the initial configuration process in the recorder, showing a phase that follows FIG. 15.

FIG. 16 shows the second example of the initial configuration process in the recorder 20, showing a phase that follows FIG. 15. In this state, another recorder 20-2 is connected to the network NW1. The number of channels of the recorder 20-2 is four, and the number of registered cameras before start-up is 0. After start-up, the recorder 20-2 determines the recorder ID in accordance with the recorder ID determination process described above. The recorder ID is 2, and the IP address is 192.168.0.252.

Subsequently, the recorder 20-2 performs the camera registration pre-process described above. However, since NO is returned in step S25 of FIG. 10 until the recorder 20-1 registers four cameras, the recorder 20-2 transmits a recorder ID inquiry packet periodically in step S24.

Figure 17:
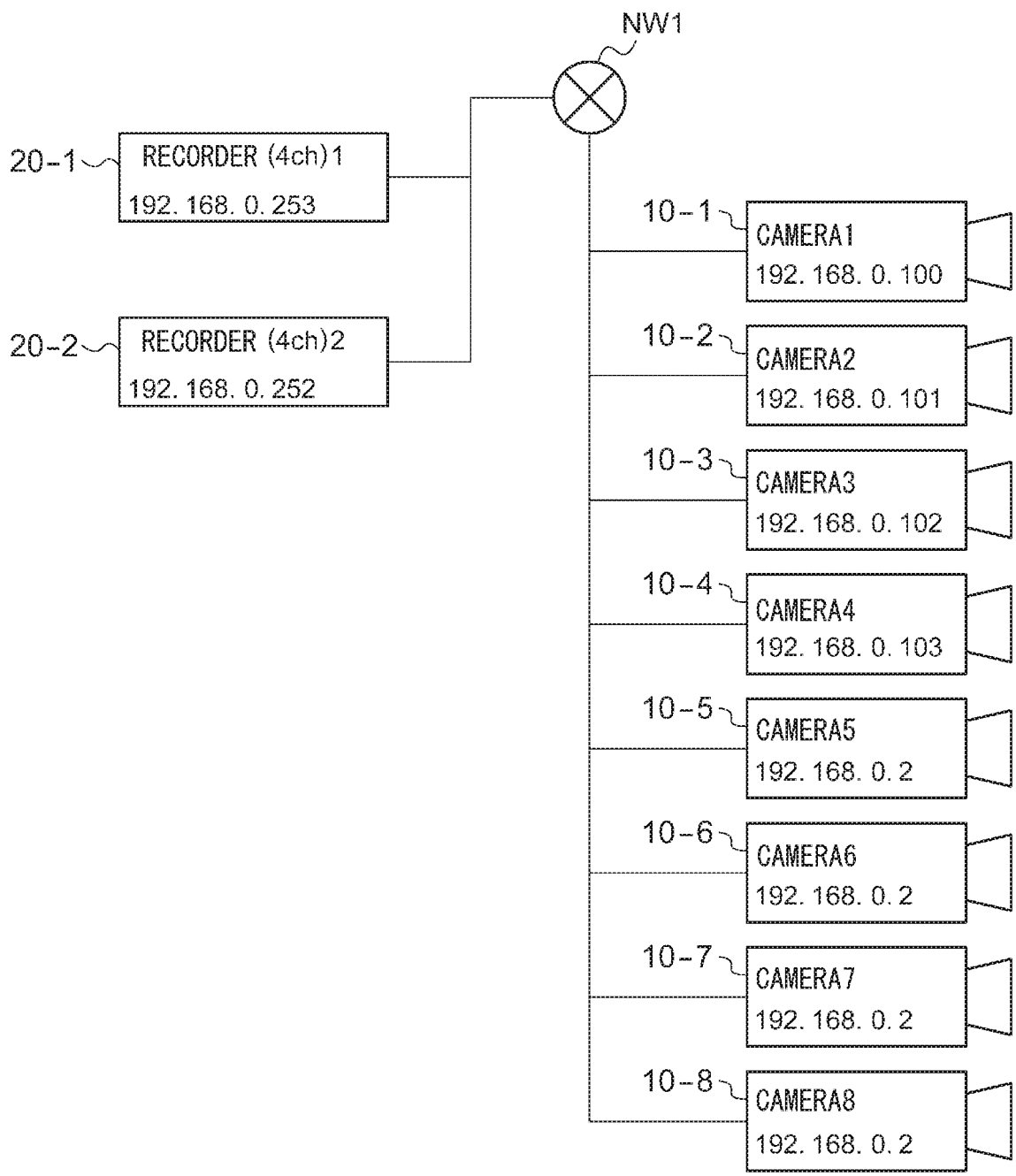
FIG. 17 shows the second example of the initial configuration process in the recorder, showing a phase that follows FIG. 16.

FIG. 17 shows the second example of the initial configuration process in the recorder 20, showing a phase that follows FIG. 16. In this state, the IP address of the fourth camera 10-4 has been configured. Therefore, the number of channels and the number of registered cameras in the recorder search command response of FIG. 3 become equal and the camera registration process in the recorder 20-1 is completed.

When the camera registration process in the recorder 20-1 is completed, YES is returned in step S25 of FIG. 10 in the process in the recorder 20-2. Therefore, the recorder 20-2 performs the camera registration process. When the recorder 20-2 searches for the cameras 10, the four cameras 10-5~10-8 with the IP addresses having the initial value are identified. Thus, the recorder 20-2 configures non-overlapping IP addresses in these four cameras 10-5~10-8 as in the case of FIG. 14 showing the first example and registers the cameras 10-5~10-8.

As described above, according to this embodiment, the camera 10 not registered in the other recorders 20 is identified. An IP address is configured in the identified camera 10, and the camera 10 in which the IP address is configured is registered. This prevents a given camera 10 from being registered in a plurality of recorders 20 in a duplicate manner. Further, the IP address of the camera 10 already configured by the recorder 20 connected earlier is prevented from being changed by the recorder 20 connected later.

Therefore, the embodiment can properly address a situation where a plurality of recorders 20 are connected to a single network NW1.

Further, the camera 10 with the IP address having a predetermined initial value is identified as the camera 10 not registered in the other recorders 20. Therefore, the camera 10 not registered in the other recorders 20 can be identified easily merely by comparing the IP address of the camera 10 with the predetermined initial value.

The recorder 20 configures an IP address of the camera 10 when another recorder 20 having the recorder ID smaller by 1 than the recorder's own recorder ID has registered the maximum number of cameras 10. This allows the recorder 20 to configure an IP address of the camera 10 when all of the other recorders 20 having the recorder IDs smaller than the recorder's own recorder ID have registered the maximum number of cameras 10. Accordingly, the IP address of the camera 10 is prevented from being changed while another recorder 20 is performing a camera registration process for registering the camera 10. Accordingly, duplicate registration is avoided more properly than otherwise. Further, a check to see whether all of the plurality of recorders 20 connected to the same network have registered the maximum number of cameras 10 can be made merely by referring to one recorder 20. Accordingly, the data volume on the network NW1 is prevented from increasing and the time required for the initial configuration process is reduced.

Second Embodiment

The second embodiment differs from the first embodiment in that the IP address and the MAC address of the camera 10 in which the IP address is configured are acquired from the recorder 20 instead of the camera 10. A description will now be given of the second embodiment, highlighting the difference from the first embodiment.

As in the first embodiment, the recorder search unit 240 broadcasts a recorder search command including a recorder ID over the network NW1. The recorder search command may be multicasted instead of broadcasted.

The responding recorder 20 receiving the recorder search command and transmitting the recorder search command response transmits the IP addresses and the MAC addresses of the cameras 10 that the responding recorder 20 has registered, in addition to the identifier of the recorder search command (RECORDER_EXIST), the recorder ID, the internal IP address, the number of channels, and the number of registered cameras. In other words, the responding recorder 20 transmits the response by adding the content of camera information table of the responding recorder 20 shown in FIG. 8.

FIG. 18 shows the recorder search command response according to the second embodiment. The recorder search command response includes the IP addresses and the MAC addresses of the cameras 10 registered in the responding recorder in addition to the data of FIG. 3.

This allows the recorder information acquisition unit 242 to acquire, in step S14 of FIG. 9, the IP addresses and the MAC addresses of the registered cameras 10 from the other recorder 20 by analyzing the recorder search command response. Therefore, the recorder information acquisition unit 242 can be said to be the address configuration information acquisition unit for acquiring the information on the cameras 10 such as the IP addresses.

The system information storing unit 260 stores the IP addresses and the MAC addresses of the cameras 10 acquired by the recorder information acquisition unit 242 in the system information table in addition to the information of the first embodiment.

FIG. 19 shows the system information table according to the second embodiment. The system information table includes the IP addresses and the MAC addresses of the respective cameras 10 and the recorder IDs associated therewith in addition to the information of FIG. 4.

As in the first embodiment, the camera search unit 246 broadcasts a camera search command over the network NW1 to search for a plurality of cameras 10.

The camera 10 receiving the camera search command transmits the camera search command response. The IP address shown in FIG. 7 of the first embodiment is not necessary in the camera search command response according to the second embodiment. In other words, it is not necessary for each camera 10 to transmit the information indicating whether or not an IP address has been configured, or, in the case the IP address has been configured, the information on the IP address configured. These items of information have been acquired from the search command response of FIG. 18 and have been stored in the system information table of FIG. 19.

In the camera registration process, the process of step S32 of FIG. 11 differs from that of the first embodiment. In step S32, the MAC address in the received camera search command response is referred to, and the camera 10 having the MAC address not stored in the system information table of FIG. 19 is identified as the camera 10 not registered in the other recorders 20.

According to this embodiment, it is possible to identify the camera 10 not registered in the other recorders 20 without acquiring the information indicating whether or not an IP address has been configured or, in the case the IP address has been configured, the information on the IP address configured. Therefore, the initial values of the IP addresses of the cameras 10 may be any value and may differ from each other. Accordingly, it is not necessary to manage the initial values of the IP addresses of the cameras 10. In the case of using a secondhand camera, for example, it is not necessary to configure the IP address to have a predetermined initial value. In other words, the user convenience is improved.

Described above is an explanation based on an exemplary embodiment. The embodiment is intended to be illustrative only and it will be understood by those skilled in the art that various modifications to constituting elements and processes could be developed and that such modifications are also within the scope of the present invention.

The communication system is described above as being the network camera system 100, the terminal device as being the camera 10, and the communication device as being the recorder 20. However, the description is non-limiting. For example, a similar benefit is obtained if the terminal device is a printer, a fax machine, etc. or if the communication device is a personal computer, etc.

The recorder IDs are described above as being assigned to the respective recorders 20 in the ascending order that the recorders 20 are started up, starting with 1. Alternatively, the recorder IDs may be configured in the descending order, starting with an arbitrary value. In other words, the recorder information configuration unit 244 may configure the recorder ID smaller by 1 than the smallest recorder ID acquired as the host recorder ID. In this case, when another recorder 20 having the recorder ID greater by 1 than the host recorder ID has registered the maximum number of cameras 10, the address configuration unit 250 may identify, of the plurality of cameras, the camera 10 not registered in the other recorders 20 and configure an IP address of the identified camera 10.

At least a part of the recorder 20 of the embodiment described above may be configured as hardware or software. In the case a part of the recorder 20 is configured as software, a program implementing at least a part of the functions of the recorder 20 may be stored in a recording medium such as a flexible disk and a CD-ROM and read into a computer for execution. The recording medium is not limited to a detachable medium such as a magnetic disk and an optical disk. The recording medium may be a fixed recording medium such as a hard disk device and a memory.

Alternatively, a program implementing at least a part of the functions of the recorder 20 may be distributed over a communication network such as the Internet. The program may be encrypted, modulated, or compressed for distribution over a wired circuit such as the Internet or a wireless circuit or for storage in a recording medium and distribution.

What is claimed is:

1. A communication device connected via a network, to a terminal device and another communication device for configuring an IP address of the terminal device, including a memory encoded with a program implemented by the communication device, the program comprising computer-implemented modules comprising:
   an acquisition module that acquires, from the other communication device, information indicating whether an IP address of the terminal device has been configured, and, in a case an IP address of the terminal device has been configured, information on the IP address configured; and
   a configuration module that configures an IP address of the terminal device in which an IP address has not been configured and which is not associated with the other communication device based on the information acquired by the acquisition module, wherein
   the acquisition module further acquires, from the other communication device, a number of terminal devices that the other communication device has configured IP addresses and a maximum number of terminal devices that the other communication device is allowed to configure IP addresses, and
   when the number of terminal devices and the maximum number of terminal devices acquired by the acquisition module match, the configuration module configures an IP address of the terminal device.

2. The communication device according to claim 1, wherein after the configuration module has configured an IP address, the communication device communicates only with the terminal device in which the configuration module has configured the IP address.

3. An address configuration method performed in a communication device connected via a network, to a terminal device and another communication device for configuring an IP address of the terminal device, the method comprising:
   acquiring, from the other communication device, information indicating whether an IP address of the terminal device has been configured, and, in a case an IP address of the terminal device has been configured, information on the IP address configured; and
   configuring an IP address of the terminal device in which an IP address has not been configured and which is not associated with the other communication device based on the information acquired by the acquiring, wherein
   in the acquiring, further acquiring, from the other communication device, a number of terminal devices that the other communication device has configured IP addresses and a maximum number of terminal devices that the other communication device is allowed to configure IP addresses, and
   in the configuring, when the number of terminal devices and the maximum number of terminal devices acquired by the acquiring match, configuring an IP address of the terminal device.

4. A non-transitory computer-readable recording medium encoded with a program used in a communication device connected via a network, to a terminal device and another communication device for configuring an IP address of the terminal device, the program comprising computer-implemented modules including:
   an acquisition module that acquires, from the other communication device, information indicating whether an IP address of the terminal device has been configured, and, in a case an IP address of the terminal device has been configured, information on the IP address configured; and a configuration module that configures an IP address of the terminal device in which an IP address has not been configured and which is not associated with the other communication device based on the information acquired by the acquisition module, wherein the acquisition module further acquires, from the other communication device, a number of terminal devices that the other communication device has configured IP addresses and a maximum number of terminal devices that the other communication device is allowed to configure IP addresses, and when the number of terminal devices and the maximum number of terminal devices acquired by the acquisition module match, the configuration module configures an IP address of the terminal device.

5. A recorder connected via a network, to a camera and another recorder for configuring an IP address of the camera, the recorder including a memory encoded with a program and implemented by the recorder, the program comprising computer-implemented modules comprising:

an acquisition module that acquires, from the other recorder, information indicating whether an IP address of the camera has been configured, and, in a case an IP address of the camera has been configured, information on the IP address configured; and a configuration module that configures an IP address of the camera in which an IP address has not been configured and which is not associated with the other recorder based on the information acquired by the acquisition module, wherein after the configuration module has configured the IP address, the camera in which the configuration module has configured the IP address communicates only with the recorder which has configured the IP address, and delivers captured imaged data to the recorder, the acquisition module further acquires, from the other recorder, a number of cameras that the other recorder has configured IP addresses and a maximum number of cameras that the other recorder is allowed to configure IP addresses, and when the number of cameras and the maximum number of cameras acquired by the acquisition module match, the configuration module configures an IP address of the camera.

\* \* \* \* \*